United States Patent
Chandrasekharan et al.

(10) Patent No.: US 9,148,042 B2
(45) Date of Patent: Sep. 29, 2015

(54) METHOD AND APPARATUS FOR DETECTION OF DRIVE MISCONFIGURATION IN A MULTI-AXIS CONFIGURATION

(71) Applicant: Rockwell Automation Technologies, Inc., Mayfield Heights, OH (US)

(72) Inventors: Nisha Chandrasekharan, Brookfield, WI (US); Gerry Nagel, Sussex, WI (US); Arun K. Guru, Brookfield, WI (US); Ryan Jwanouskos, White Bear Lake, MN (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 14/042,910

(22) Filed: Oct. 1, 2013

(65) Prior Publication Data
US 2015/0091486 A1    Apr. 2, 2015

(51) Int. Cl.
| H02P 7/00 | (2006.01) |
| H02P 5/00 | (2006.01) |
| H02K 11/00 | (2006.01) |
| H02P 1/00 | (2006.01) |

(52) U.S. Cl.
CPC ............... *H02K 11/001* (2013.01); *H02P 1/00* (2013.01)

(58) Field of Classification Search
CPC ......... H02J 1/10; H02J 2001/106; H02J 3/06; H02J 3/14; H02J 3/18; H02J 3/24; H02J 3/36; H02K 11/001; G01R 31/343
USPC .................................................. 318/490, 491
See application file for complete search history.

(56) References Cited

U.S. PATENT DOCUMENTS

| 4,678,980 | A | * | 7/1987 | Sugimoto et al. | ............. 318/759 |
| 2003/0036806 | A1 | * | 2/2003 | Schienbein et al. | ............. 700/1 |
| 2003/0218887 | A1 | * | 11/2003 | Kojori et al. | ..................... 363/16 |
| 2012/0217920 | A1 | * | 8/2012 | Singh et al. | .................... 318/490 |

* cited by examiner

Primary Examiner — Eduardo Colon Santana
Assistant Examiner — Gabriel Agared
(74) Attorney, Agent, or Firm — Boyle Fredrickson, S.C.

(57) ABSTRACT

A system for detecting a mismatch between how a motor drive is connected electrically and how it is configured for operation is disclosed. The motor drive may either be connected in a stand-alone mode to control operation of a motor from an AC source without connection to another motor drive or be connected electrically to other motor drives, for example, in a paralleled mode, shared DC bus mode, or a combination thereof. A parameter identifies the expected electrical configuration of the motor drive. The power transferred to the DC bus is compared to the power transferred from the DC bus in the motor drive. If the difference between the power transferred to the DC bus and the power transferred from the DC bus exceeds a predetermined threshold, the motor drive detects the mismatch between how a motor drive is connected electrically and how it is configured for operation.

10 Claims, 5 Drawing Sheets

METHOD AND APPARATUS FOR DETECTION OF DRIVE MISCONFIGURATION IN A MULTI-AXIS CONFIGURATION

BACKGROUND OF THE INVENTION

The subject matter disclosed herein relates generally to a system for detecting misconfiguration of a motor drive and, more specifically, to detecting that the selected operating mode of the motor drive does not match the wiring to the motor drive.

As is known to those skilled in the art, motor drives are used to convert a fixed voltage input into a variable amplitude and variable frequency output to control operation of a motor. The voltage input may be a single phase or three phase alternating current (AC) voltage. The motor drive typically converts the AC voltage into a direct current (DC) voltage present on a DC bus and subsequently converts the DC voltage into the variable amplitude and variable frequency output voltage. Conversion of the AC voltage to the DC voltage is performed by a converter and conversion of the DC voltage to the variable amplitude and variable frequency output voltage is performed by an inverter.

It is also known that motor drives or motor drive systems may be arranged in many different configurations. In one application, a single motor may be controlled by a single motor drive in a stand-alone configuration. In other applications, multiple motors may require control. Although individual drives may still be connected in a stand-alone configuration to control multiple motors, the motor drives may also be configured such that the AC inputs and/or the DC busses of the motor drives are connected in a shared AC, shared DC, or shared AC/DC configuration. According to still another option, a first motor may have a drive including a converter having a sufficient power rating to provide power to multiple motors. Each additional motor may have a motor drive with an equal or lower power rating connected in a shared DC bus configuration such that the additional motor drives receive power from the first motor drive. Although the motor drives or motor drive systems may have many different configurations, it is commercially advantageous to provide a single device capable of being configured to operate in each of the configurations.

A motor drive capable of being configured to operate in the various configurations includes terminals providing electrical connections to the converter, DC bus, and inverter within the device. Electrical conductors are connected between the terminals and a power source, another DC bus, or a motor according to the application requirements. In addition, the device includes one or more parameters corresponding to the configuration. A single parameter may be set to identify an operation mode, which, in turn, may be used to set additional parameters. Optionally, multiple parameters may be individually adjusted to configure the device. The parameters may configure, for example, overload warning and/or fault levels. If the parameters are not properly configured, the drive may be subject to alarms and/or faults occurring at levels inconsistent with the wiring or the drive may post alarms and/or faults unrelated to the real problem, namely that the parameters are not configured according to how the drive is wired.

Thus, it would be desirable to provide a system for detecting a difference between the configuration of the parameters of a motor drive and the configuration of the wiring connected to the motor drive.

BRIEF DESCRIPTION OF THE INVENTION

The subject matter disclosed herein describes a system for detecting a mismatch between how a motor drive is connected electrically and how it is configured for operation. According to a first operating mode, the motor drive may be connected in a stand-alone mode to control operation of a motor from an AC source without connection to another motor drive. Alternately, the motor drive may be connected electrically to other motor drives, for example, in a shared AC/DC mode, shared DC bus mode, or a combination thereof. In a shared AC/DC mode, both the AC input terminals and the DC bus terminals of a first motor drive are connected in parallel with the AC input terminals and the DC bus terminals of at least one additional motor drive. In a shared DC bus mode, a first motor drive is connected to the AC source and the DC bus terminals of the first motor drive are connected in parallel to the DC bus terminals of at least one additional motor drive. An internal parameter is set to identify to the control software the expected electrical configuration of the motor drive. During operation of the motor drive the power transferred from the AC source to the DC bus in the motor drive is compared to the power transferred from the DC bus to a motor connected to the motor drive. Depending on the operating mode, the motor drive expects a certain correlation between the input power and the output power of the motor drive, if the difference between the power transferred from the AC source to the DC bus and the power transferred from the DC bus to a motor exceeds a predetermined threshold, the motor drive detects that the operating mode identified by the parameter does not match the electrical wiring connected to the motor drive.

According to one embodiment of the invention, a method of detecting a mismatch between wiring and configuration of a motor control system configurable to operate in one of a stand-alone mode, a paralleled mode, and a shared DC bus mode is disclosed. The method includes the steps of determining a level of power drawn by a converter in the motor control system and determining a level of power delivered by an inverter in the motor control system. An input of the converter is electrically connected to an AC power source and an output of the converter is electrically connected to a DC bus in the motor control system. An input of the inverter is electrically connected to the DC bus and an output of the inverter is electrically connected to a motor. A parameter is read from a memory device in the motor control system, where the parameter identifies one of the stand-alone mode, the paralleled mode, and the shared DC bus mode in which the motor control system is configured to operate. An acceptable range for a difference between the level of power drawn by the converter and the level of power delivered by the inverter is identified as a function of the parameter defining the mode in which the motor control system is configured to operate, and the mismatch between wiring and configuration of the motor control system is detected when the difference is outside the acceptable range.

According to another embodiment of the invention, a motor drive for controlling operation of a motor includes a DC bus having a DC voltage, an inverter configured to convert the DC voltage to an AC voltage provided to the motor, a first sensor configured to generate a signal corresponding to the DC voltage present on the DC bus, a second sensor configured to generate a signal corresponding to a current present on the DC bus, a third sensor configured to generate a signal corresponding to a current provided to the motor, a memory device configured to store a plurality of parameters for configuration of the motor drive and to store a plurality of instructions for controlling operation of the motor drive, and a processor. The processor is configured to execute the plurality of instructions to determine a magnitude of power present on the DC bus as a function of the DC voltage and of the current present on the DC bus, determine a magnitude of power present at the motor as a function of the AC voltage and of the current provided to the motor, read one of the parameters to identify a desired operating mode of the motor drive, identify an acceptable range for a difference between the magnitude of power present on the DC bus and the magnitude of power present at the motor as a function of the desired operating mode, and detect a mismatch between wiring and configuration of the motor drive when the difference is outside the acceptable range.

According to yet another embodiment of the invention, a motor control system for controlling operation of a motor includes a converter, an inverter, and a DC bus. The converter has an input and an output, where the input is configured to receive an AC voltage, and the converter is configured to convert the AC voltage at the input to a DC voltage for the output. The inverter has an input and an output, where the input is configured to receive a DC voltage, and the inverter is configured to convert the DC voltage at the input to an AC voltage for the output. The DC bus is configured to be electrically connected between the output of the converter and the input of the inverter. A processor is configured to receive a first voltage signal, a second voltage signal, a first current signal, and a second current signal. The first voltage signal corresponds to the DC voltage at the output of the converter, the second voltage signal corresponds to the AC voltage present at the output of the inverter, the first current signal corresponds to a current at the output of the converter, and the second current signal corresponds to a current at the output of the inverter. The processor is further configured to determine a magnitude of power drawn from the converter as a function of the first voltage signal and of the first current signal, determine a magnitude of power present at the motor as a function of the second voltage signal and of the second current signal, determine an acceptable range for a difference between the magnitude of power drawn from the converter and the magnitude of power present at the motor as a function of an operating mode of the motor control system, and detect a mismatch between wiring and configuration of the motor control system when the difference is outside the acceptable range.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
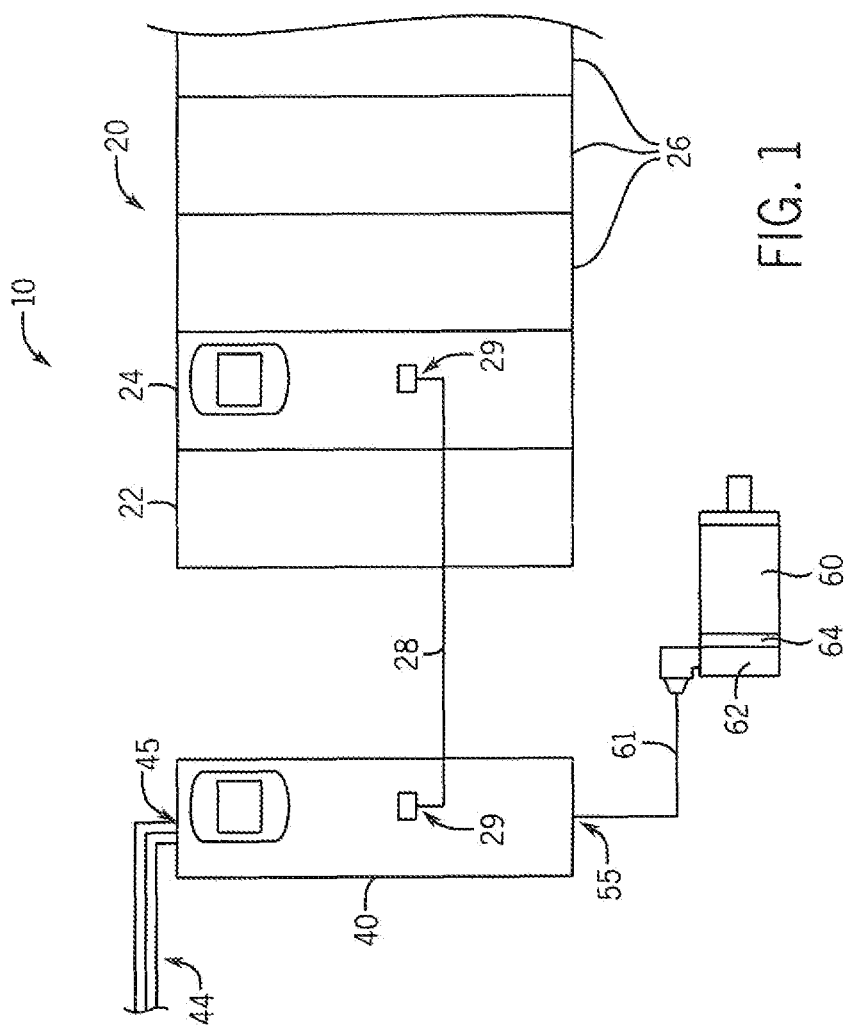
FIG. 1 is an exemplary industrial control system incorporating a stand-alone motor drive according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Figure 2:
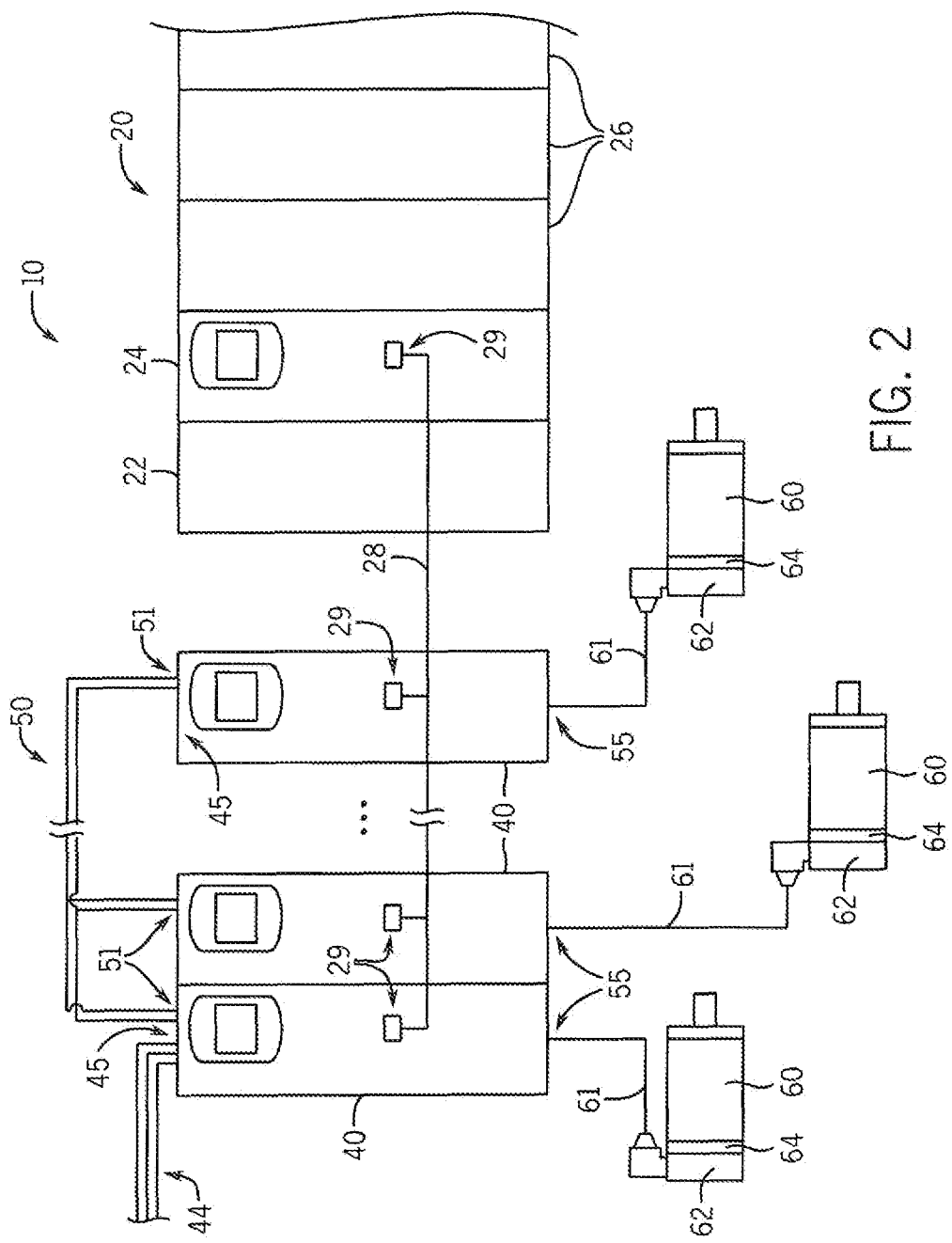
FIG. 2 is an exemplary industrial control system incorporating a shared DC bus motor drive system according to one embodiment of the invention.
Figure 3:
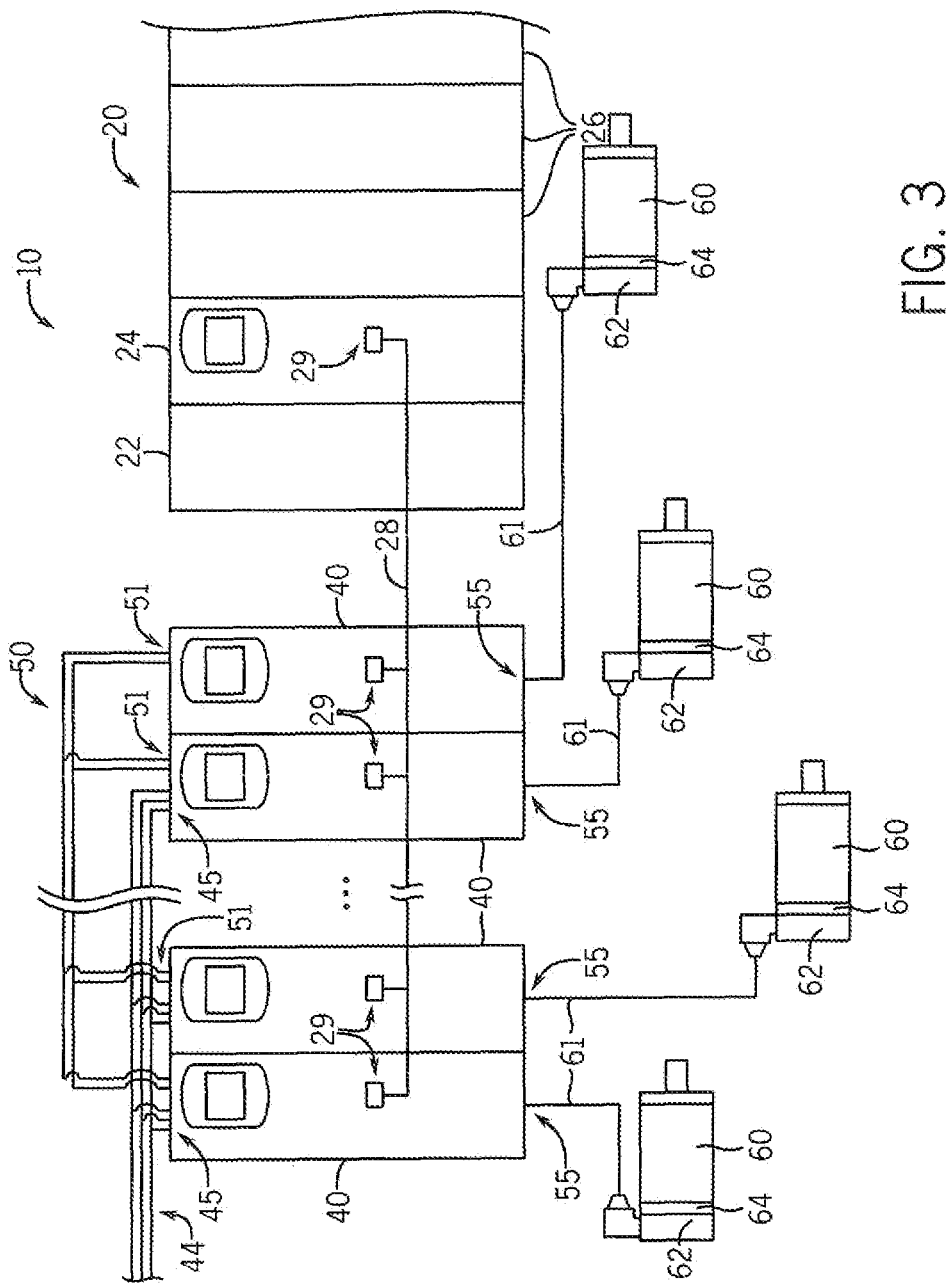
FIG. 3 is an exemplary industrial control system incorporating a hybrid motor drive system according to one embodiment of the invention.

Multiple embodiments of a motor control system 10 according to the present invention are illustrated in FIGS. 1-3. Referring initially to FIG. 1, a motor drive 40 is configured for stand-alone operation. The motor drive 40 is connected to a three phase AC input voltage 44 at a set of input terminals 45. A cable 61 is connected between a set of output terminals 55 and a motor 60. It is contemplated that the cable 61 may be formed from a single cable having multiple conductors, multiple cables, each having multiple conductors, individual wires, or a combination thereof. The cable 61 conducts the power output to the motor 60 and all control signals between the motor drive 40 and the motor 60. The control signals may include, for example, a signal to open or close a brake 62 and/or feedback signals from an encoder or resolver 64 corresponding to an angular position of the motor 60.

The motor control system 10 may also include an industrial controller 20 configured to provide a reference signal corresponding to desired operation of the motor drive 40. Industrial controllers 20 are special purpose computers used for controlling factory automation and the like. The industrial controller 20 includes a power supply 22, a processor module 24 and various Input/Output (I/O) modules 26 according to the application requirements. Industrial controllers 20 typically execute a control program highly customized to a particular control application. Special control languages, such as "relay ladder logic" are normally used to facilitate programming of the device. Under the direction of the stored program, a processor of the industrial controller 20 may generate a reference signal for the motor drive 40 as a function of the state of input devices connected to the I/O modules 26. A communication cable 28 is connected between ports 29 on the processor module 24 and the motor drive 40. The communication cable 28 may be a separate electrical conductors or a cable configured according to an industrial network specification.

Figure 4:
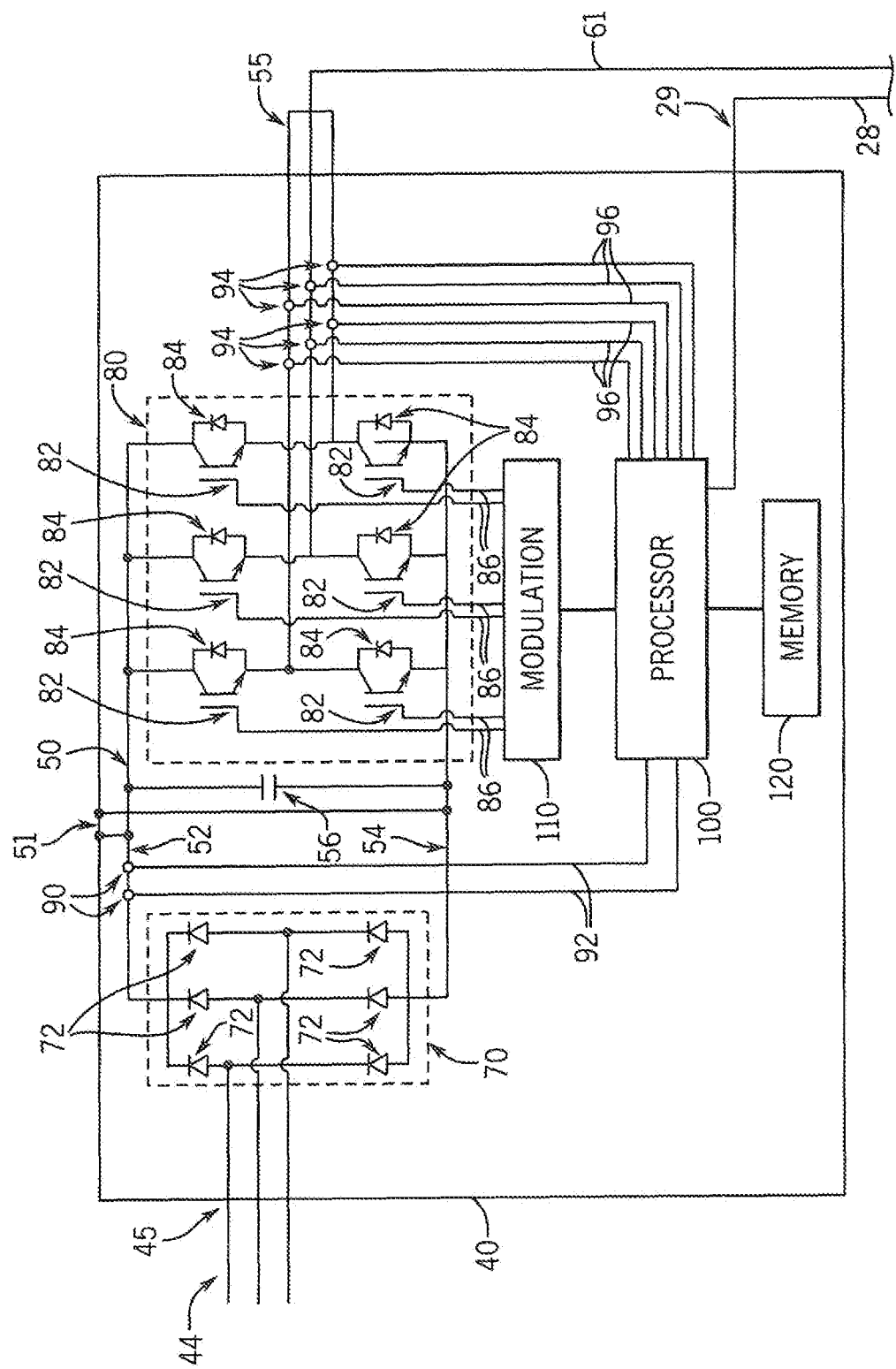
FIG. 4 is a schematic representation of a motor drive of FIGS. 1-3.

Referring next to FIG. 2, the motor control system 10 may also be configured to operate in a shared DC bus operating mode. Multiple motor drives 40 are provided and one of the motor drives 40 is connected to a three phase AC input voltage 44 at a set of input terminals 45. According to one embodiment, each of the motor drives 40 may be identical. Optionally, one or more of the motor drives 40 may have different power ratings. According to yet another embodiment, one of the motor drives 40 includes a converter 70, DC bus 50, and an inverter 80, as illustrated in FIG. 4. The remaining motor drives 40 have a DC bus 50 and an inverter 80, and the DC bus terminals 51 of each motor drive 40 are connected in parallel to establish a shared DC bus 50. A cable 61 is connected between each set of output terminals 55 and a motor 60 to be controlled by the corresponding motor drive 40. Optionally, the inverter 80 may be mounted on the motor 60 and the cable 61 may be replaced by internal connections within a single housing enclosing both the inverter 80 and the motor 60. The communication cable 28 is extended between the industrial controller 20 and each motor drive 40. Optionally, a separate communication cable 28 may be connected between the industrial controller 20 and one or more of the motor drives 40.

Referring next to FIG. 3, the motor control system 10 may also be configured to operate in a hybrid configuration where a portion of the motor drives 40 are configured to operate in a first mode and a portion of the motor drives 40 are configured to operate in a second mode. According to the illustrated embodiment, the first three motor drives 40 are connected in a shared AC/DC configuration, also referred to as a paralleled mode. The AC input voltage 44 is connected in parallel to the input terminals 45 of each of the first three motor drives 40. The DC bus 50 is also connected in parallel to the DC bus terminals 51 of the first two motor drives 40. The last motor drive 40 is connected in a shared DC bus configuration as discussed above. It is contemplated that various numbers of motor drives 40 may be connected either in the shared AC/DC configuration or in the shared. DC bus configuration. A cable 61 is connected between each set of output terminals 55 and a motor 60 to be controlled by the corresponding motor drive 40. The communication cable 28 is extended between the industrial controller 20 and each motor drive 40. Optionally, a separate communication cable 28 may be connected between the industrial controller 20 and one or more of the motor drives 40.

Turning next to FIG. 4, the motor drive 40 is connected to a three phase AC input voltage 44 and generates a three phase AC output voltage 55 to control a motor 60. It is contemplated that the output voltage 55 could be a single phase AC output voltage, a multi-phase AC output voltage, or a DC voltage, as required by the motor connected to the drive without deviating from the scope of the invention. The AC input voltage 44 is converted to a DC voltage present on the DC bus 50 by a converter 70. The converter 70 may be either passive (as illustrated) or active, where a passive rectifier utilizes electronic devices such as diodes 72, which require no control signals, to convert the AC voltage to a DC voltage and an active converter utilizes, for example, transistors, which receive switching signals to turn on and off, to convert the AC voltage to a DC voltage.

The DC voltage potential is present between a positive rail 52 and a negative rail 54 of the DC bus 50. Each of the positive rail 52 and the negative rail 54 are connected to one of the DC bus terminals 51 to provide an external connection to the DC bus 50. A DC bus capacitor 56 is connected between the positive and negative rails, 52 and 54, to reduce the magnitude of the ripple voltage resulting from converting the AC voltage to a DC voltage. It is understood that the DC bus capacitor 56 may be a single capacitor or multiple capacitors connected in parallel, in series, or a combination thereof. The magnitude of the voltage potential between the positive and negative rails, 52 and 54, is generally about equal to the magnitude of the peak of the AC input voltage. Sensors 90 measure the voltage and/or current on the DC bus 50 and provide a signal 92 corresponding to the measured voltage and/or current to a processor 100.

The DC voltage on the DC bus 50 is converted to an AC voltage by an inverter 80. The inverter 80 converts the DC voltage to a three-phase output voltage 55 supplied to the motor 60. The inverter 80 includes multiple switches which selectively connect one phase of the output voltage 55 to either the positive rail 52 or the negative rail 54. Each switch may be a transistor 82 and further include a diode 84 connected in parallel to the transistor 82. Each transistor 82 receives a switching signal 86 to enable or disable conduction through the transistor 82 to selectively connect each phase of the output voltage 55 to either the positive rail 52 or the negative rail 54 of the DC bus 50. The current output from the inverter 80 is measured and provided as a feedback signal 96 to the processor 100. Sensors 94 measure the voltage and/or current on one, two, or all three phases of the output voltage 55 and provide signals 96 corresponding to the measured voltage and/or current to the processor 100.

The processor 100 is configured to execute a program stored on a memory device 120, where the program includes a series of instructions executable on the processor. The program receives a reference signal identifying desired operation of the motor 60 connected to the motor drive 40. The program executes a control routine responsive to the reference signal and the feedback signals 92, 96 from the sensors 90, 94. The control routine generates a desired voltage reference signal for a modulation routine. As illustrated, a separate modulation module 110 is provided to execute the modulation routine. The modulation module may be a dedicated motor controller or implemented on an ASIC or FPGA. Optionally, the modulation module may be integrated with and execute on the processor 100. The modulation routine, such as pulse width modulation (PWM), generates the switching signals 86 to control the transistor 82 in the inverter 80 responsive to the desired voltage reference signal.

As described above, the motor control system 10 may be configured for multiple modes of operation. Multiple motor drives 40 may be included in the motor control system 10 and each motor drive 40 may be configured for stand-alone operation, shared DC bus operation, or shared AC/DC bus operation. Within a motor control system 10, one or more motor drives 40 may be configured in each mode of operation. According to one embodiment of the invention, a single motor drive 40 is configurable to operate in each mode of operation. Terminals are provided on the motor drive 40 to receive the electrical wiring for each mode of operation, and a memory device stores at least one parameter defining the desired operating mode. According to one embodiment of the invention, a single parameter defines the operating mode. Optionally, a combination of parameters may be used to define the operating mode.

In operation, the motor drive 40, according to one embodiment of the invention, may be configured to monitor the power transferred between the AC power source 44 and the motor drive 40 and to monitor the DC bus 50 via the converter 70. The power transferred from the DC bus 50 to the motor 60 may be monitored via the inverter 80. According to one embodiment of the invention, a single processor 100 controls both the converter 70 and the inverter 80 and monitors both power transfers. Optionally, separate processors 100 control the converter 70 and the inverter 80. Each processor 100 may determine the power transferred by the corresponding power converter and the information is communicated between the processors 100. A comparison between the power delivered to and drawn from the DC bus 50 may be used to determine whether the wiring to the motor drive 40 matches the configuration of the motor drive 40. In certain configurations, the presence of power when none is expected may identify an incorrect configuration. For example, if the motor drive 40 is configured as a shared DC drive and current is flowing in the converter 70 indicating power is present, the converter may be wired as a stand-alone or as a shared AC/DC drive.

Sensors 90 are provided at the output of the converter 70 to measure the voltage and/or current on the DC bus 50 which provide signals 92 corresponding to this voltage and/or current to the processor 100. The power drawn by the converter 70 is determined by multiplying the magnitude of voltage by the magnitude of current. The power measurement is preferably averaged or filtered over time to avoid spurious results that may be generated by noise or other spikes in instantaneous measurements. Similarly, sensors 94 provided at the output of the inverter 80 may measure the voltage and/or current provided at the output 55 of the motor drive 40 to the motor 60 which provide signals 96 corresponding to this voltage and current to the processor 100. Optionally, a voltage reference signal provided as an input to the inverter 80, or another internal voltage signal corresponding to an expected voltage output, may be utilized by the processor 100 in determining the power delivered by the inverter 80. The power delivered by the inverter 80 is determined by multiplying the magnitude of voltage by the magnitude of current. The power measurement is preferably averaged or filtered over time to avoid spurious results that may be generated by noise or other spikes in instantaneous measurements.

Figure 5:
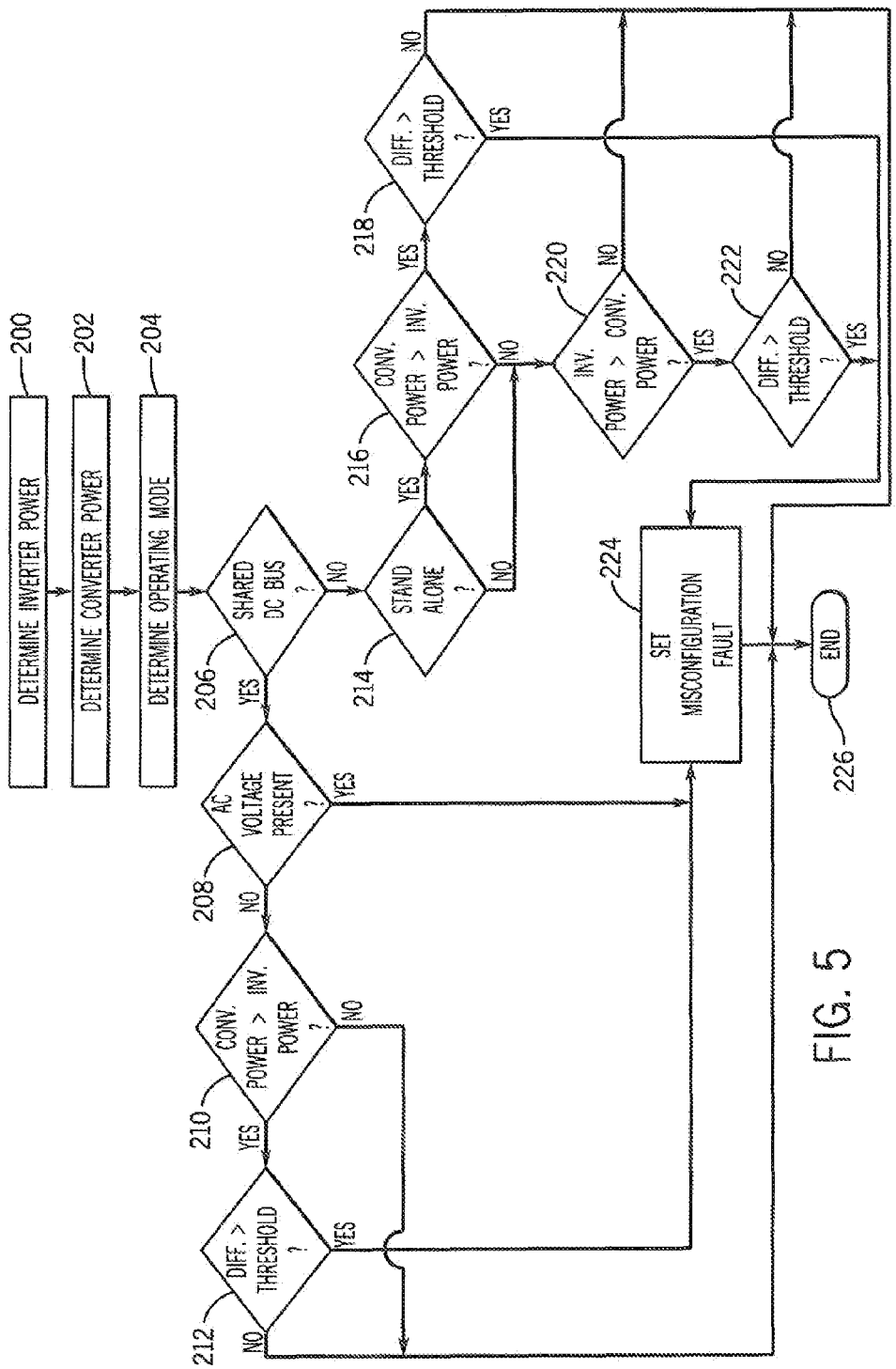
FIG. 5 is a flowchart illustrating the steps in detecting a misconfiguration between wiring and setup of the motor drive of FIG. 4.

Referring next to FIG. 5, the process for detecting a configuration mismatch is illustrated. Although illustrated as a single check, it is contemplated that the mismatch check is schedule for periodic execution by the processor 100. At steps 200 and 202, the processor 100 determines the inverter power and the converter power, respectively. As discussed above, the processor 100 receives signals, measured or internal to the motor drive 40, corresponding to the current and voltage present on the DC bus 50 and at the output 55 of the motor drive 40. The processor 100 determines the inverter power as a function of the voltage and current output to the motor 60 and determines the converter power as a function of the voltage and current present on the DC bus 50. At step 204, the processor 100 reads a parameter from the memory device 120 to determine the operating mode in which the motor drive 40 is configured to operate. At step 206, the processor 100 determines whether the parameter indicates the motor drive 40 is configured to operate in the shared DC bus mode.

If the motor drive 40 is configured to operate in the shared DC bus mode, the processor 100 determines whether the converter 70 and inverter 80 are operating as expected for shared DC bus mode. A motor drive 40 configured to operate in the shared DC bus mode may not have a converter 70 as it expects to receive power via a connection to the DC bus 50 from another motor drive 40. However, if the motor drive 40 does include a converter 70, in shared DC bus mode there should be no AC power connected to the input terminals 45 of the motor drive 40. The motor drive 40 may include a sensor detecting the AC voltage or, optionally, receive an input signal from an external sensor corresponding to an AC voltage present at the input terminals 45 of the motor drive 40. At step 208, the processor 100 checks whether there is an AC voltage present at the input terminals 45. If the processor 100 detects an AC voltage at the input terminals 45 when the motor drive is configured to operate in the shared DC bus mode, the misconfiguration fault is set, as shown in step 224. If no AC voltage is detected, the motor drive 40 may not be configured to detect the AC voltage present on the input terminals 45. At step 210, therefore, the processor 100 executes the mismatch check to compare the levels of power transferred by the inverter 80 and by the converter 70. If the level of power transferred by the inverter 80 exceeds the level of power transferred by the converter 70, the motor drive 40 is operating as expected and execution of the mismatch check ends, as shown at step 226. If the level of power transferred by the converter 70 exceeds the level of power transferred by the inverter 80, the mismatch check compares the difference in the two power levels against a threshold, as shown in step 212. If the difference in the power levels is less than the threshold, the mismatch check is complete. If, however, the level of power drawn by the converter 70 exceeds the level of power drawn by the inverter 80 by an amount greater than the threshold, a misconfiguration fault is set, as shown in step 224. Optionally, because the motor drive 40 expects no power to be drawn by the converter 70 when configured in shared DC bus mode, the processor 100 may compare the level of power determined for the converter 70 to zero or to some small value. If the level of power drawn by the converter 70 exceeds zero or the small value, the misconfiguration fault may be set.

If the motor drive 40 is not configured to operate in the shared DC bus mode, the processor 100 next determines whether the motor drive 40 is configured to operate in stand-alone mode, as shown in step 214. If the motor drive 40 is configured to operate in stand-alone mode, the processor 100 expects that the power drawn from the input voltage 44 is approximately equal to the power supplied to the motor 60, less inefficiencies inherent in the motor drive 40. Consequently, the processor 100 will check if either the converter 70 or the inverter 80 power level is greater than the other. At step 216, the processor 100 checks if the power drawn by the converter 70 is greater than the power drawn by the inverter 80, and, at step 220, the processor 100 checks if the power drawn by the inverter 80 is greater than the power drawn by the converter 70. At steps 218 and 222, the processor compares the difference between the power levels of the converter 70 and the inverter 80 to the threshold. It is contemplated that a single threshold may be used for both checks. Optionally, a first threshold may be used at step 218 to compare the difference if the power drawn by the converter 70 exceeds the power drawn by the inverter 80, and a second threshold may be used at step 222 to compare the difference if the power drawn by the inverter 80 exceeds the power drawn by the converter 70. Because some variation in the power levels may be expected, the threshold is selected at a sufficient level to avoid spurious detection of a mismatch between the wiring and the configuration in the motor control system 10. The threshold may be set between about 25% and about 65% of the rated power of the motor drive 40. For motor drives 40 having a lower power rating, for example, the threshold may be set to a higher percentage while for motor drives 40 having a higher power rating, the threshold maybe set to a lower percentage.

If, at step 218, the power drawn by the converter 70 exceeds the power drawn by the inverter 80 by an amount greater than the threshold, the mismatch fault is set. The difference indicates that motor drive 40 is unexpectedly receiving power on the DC bus 50 from the converter 70. This may occur when the motor drive 40 is configured in stand-alone mode but is wired for shared AC/DC operation. During stand-alone mode, the only expected draw from the DC bus 50 is the inverter 80 within the motor drive 40. Thus, the power drawn by the inverter 80 should equal the power supplied by the converter 70. However, in shared AC/DC operation, a second motor drive 40 may require power from the shared DC bus 50. Consequently, more power may be transferred from the AC source 44 to the DC bus 50 by the converter 70 than used by the inverter 80 of that motor drive 40. If, however, at step 218 the power drawn by the converter 70 differs from the power drawn by the inverter 80 by an amount less than the threshold, the mismatch check ends.

If at step 222, the power drawn by the inverter 80 exceeds the power drawn by the converter 70 by an amount greater than the threshold, the mismatch fault is set. The difference indicates that motor drive 40 is unexpectedly receiving power via a shared DC bus 50. This may occur when the motor drive 40 is configured in stand-alone operation but wired for shared DC bus. As previously discussed, during stand-alone operation, the motor drive 40 expects the converter 70 to supply the power to the DC bus 50 which is, in turn, provided to the motor 60 by the inverter 80. In contrast, during shared DC bus operation, the motor drive 40 receives power on the shared DC bus from another converter 70, either a stand-alone unit or contained within another motor drive 40, and more power may be transferred from the DC bus 50 to the motor 60 by the inverter 80 than drawn by the converter 70 of that motor drive 40. Therefore, if the power drawn by the inverter 80 exceeds the power drawn by the converter 70 by an amount greater than the threshold in stand-alone mode, the motor drive 40 detects a misconfiguration. If, however, at step 222 the power drawn by the inverter 80 differs from the power drawn by the converter 70 by an amount less than the threshold in stand-alone mode, the mismatch check ends.

If the motor drive 40 is not configured to operate in either shared DC bus mode or stand alone mode, it is configured to operate in a shared AC/DC operating mode. The controller 100 again executes steps 220 and 222 to determine whether the power drawn by the inverter 80 exceeds the power drawn by the converter 70 by an amount greater than the threshold. Similar to stand-alone mode, the motor drive 40 expects the converter 70 to supply the power to the DC bus 50 in shared AC/DC mode. In contrast, during shared DC bus operation, the motor drive 40 receives power on the shared DC bus from another converter 70, either a stand-alone unit or contained within another motor drive 40, and more power may be transferred from the DC bus 50 to the motor 60 by the inverter 80 than drawn by the converter 70 of that motor drive 40. Therefore, if the power drawn by the inverter 80 exceeds the power drawn by the converter 70 by an amount greater than the threshold in shared AC/DC mode, the motor drive 40 detects a misconfiguration. If, however, at step 222 the power drawn by the inverter 80 differs from the power drawn by the converter 70 by an amount less than the threshold in shared AC/DC mode, the mismatch check ends.

When a mismatch between the wiring and the configuration is detected, the misconfiguration fault may be transmitted by the motor drive 40 to the industrial controller 20. The industrial controller 20, in turn, may provide an indication to an operator of the mismatch, for example, via an audible alarm, a visual alarm, or a data message transmitted to a remote device. In some embodiments of the invention, one motor drive 40 may be configured to communicate with the other motor drives 40. If one motor drive 40 detects a mismatch, each of the other motor drives 40 may receive notification of the fault and control its respective motor to a stop and/or a safe operating mode to allow the mismatch to be corrected. In other embodiments of the invention, each motor drive 40 communicates only to the industrial controller 20 and not to the other motor drives 40. The motor drive 40 communicates the mismatch to the industrial controller 20, and the industrial controller 20 is configured to disable the other motor drives 40 in the motor control system 10 to allow the mismatch to be corrected.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method of detecting a mismatch between wiring and configuration of a motor control system configurable to operate in one of a stand-alone mode, wherein a converter and an inverter are connected independently of another converter and another inverter; a paralleled mode, wherein at least two converters each receive a common input voltage and at least two inverters connected to the at least two converters share a DC bus; and a shared DC bus mode, wherein the converter is connected independently of another converter and at least two inverters share a DC bus connected to the converter; the method comprising the steps of:

determining a first level of power drawn by a converter in the motor control system, wherein an input of the converter is electrically connected to an AC power source and an output of the converter is electrically connected to a DC bus in the motor control system;

determining a second level of power delivered by an inverter in the motor control system, wherein an input of the inverter is electrically connected to the DC bus and an output of the inverter is electrically connected to a motor;

reading a parameter from a memory device in the motor control system, the parameter identifying one of the stand-alone mode, the paralleled mode, and the shared DC bus mode in which the motor control system is configured to operate;

identifying a relationship between the first level of power drawn by the converter and the second level of power delivered by the inverter as a function of the parameter defining the mode in which the motor control system is configured to operate; and detecting that the wiring is configured for one of the stand-alone mode, the paralleled mode, and the shared DC bus mode and the parameter is set to a different mode than the wiring, the different mode selected from one of the stand-alone mode, the paralleled mode, and the shared DC bus mode, when the first level of power does not match the relationship to the second level of power.

2. The method of claim 1 wherein the step of determining the first level of power drawn by the converter further comprises the steps of:

generating a first signal with a first sensor corresponding to a voltage present on the DC bus;

generating a second signal with a second sensor corresponding to a current present on the DC bus; and determining the first level of power drawn by the converter as a function of the first and second signals.

3. The method of claim 1 wherein the relationship between the first level of power and the second level of power is defined as:

the difference between the first level of power and the second level of power is within a range during the stand-alone mode, the first level of power is greater than or equal to the second level of power during the paralleled mode, and the first level of power is less than the second level of power during the shared DC bus mode.

4. A motor drive for controlling operation of a motor, the motor drive comprising:
- a DC bus having a DC voltage;
- an inverter configured to convert the DC voltage to an AC voltage provided to the motor;
- a first sensor configured to generate a first signal corresponding to the DC voltage present on the DC bus;
- a second sensor configured to generate a second signal corresponding to a current present on the DC bus;
- a third sensor configured to generate a third signal corresponding to a current provided to the motor;
- a memory device configured to store a plurality of parameters for configuration of the motor drive and to store a plurality of instructions for controlling operation of the motor drive; and
- a processor configured to receive the first signal, the second signal, and the third signal and further configured to execute the plurality of instructions to:
  - determine a first magnitude of power, wherein the first magnitude of power is present on the DC bus and is a function of the first signal and the second signal,
  - determine a second magnitude of power, wherein the second magnitude of power is present at the motor and is a function of the AC voltage provided to the motor and of the third signal,
  - read one of the parameters to identify a desired operating mode of the motor drive, wherein the desired operating mode is selected from one of:
    - a stand-alone mode in which wiring of the motor drive electrically connects the DC bus to a converter configured to convert an AC voltage to a DC voltage for the DC bus and not to any other DC bus of another motor drive,
    - a paralleled mode in which the wiring of the motor drive electrically connects the DC bus to at least one other DC bus of another motor drive and to the output of a converter configured to convert an AC voltage to a DC voltage for the DC bus, and
    - a shared DC bus mode in which the wiring of the motor drive electrically connects the DC bus to at least one other DC bus of another motor drive,
  - identify a relationship between the first magnitude of power present on the DC bus and the second magnitude of power present at the motor as a function of the desired operating mode, and
  - detect that the wiring of the motor drive is configured for one of the stand-alone mode, the paralleled mode, and the shared DC bus mode and the desired operating mode of the motor drive is set to a different mode than the wiring, the different mode selected from one of the stand-alone mode, the paralleled mode, and the shared DC bus mode, when the first magnitude of power does not match the relationship to the second magnitude of power.

5. The motor drive of claim 4, wherein the relationship between the first magnitude of power and the second magnitude of power is defined as:
- the difference between the first magnitude of power and the second magnitude of power is within a range during the stand-alone mode,
- the first magnitude of power is greater than or equal to the second magnitude of power during the paralleled mode, and
- the first magnitude of power is less than the second magnitude of power during the shared DC bus mode.

6. A motor control system for controlling operation of at least one motor, the motor control system comprising:
- at least one converter having an input and an output, wherein the input is configured to receive an AC voltage and each converter is configured to convert the AC voltage at the input to a DC voltage for the output;
- at least one inverter having an input and an output, wherein the input is configured to receive a DC voltage and each inverter is configured to convert the DC voltage at the input to an AC voltage for one of the at least one motors connected to the output;
- at least one DC bus, each DC bus configured to be electrically connected between the output of one of the at least one converters and the input of one of the at least one inverters; and
- at least one processor, each processor configured to receive a first voltage signal, a second voltage signal, a first current signal, and a second current signal, wherein the first voltage signal corresponds to the DC voltage at the output of one of the at least one converters, the second voltage signal corresponds to the AC voltage present at the output of one of the at least one inverters, the first current signal corresponds to a current at the output of one of the at least one converters, the second current signal corresponds to a current at the output of one of the at least one inverters, and wherein each processor is further configured to:
  - determine a first magnitude of power as a function of the first voltage signal and of the first current signal, wherein the first magnitude of power corresponds to power drawn from the corresponding converter,
  - determine a second magnitude of power as a function of the second voltage signal and of the second current signal, wherein the second magnitude of power corresponds to power present at the corresponding inverter,
  - determine a relationship between the first magnitude of power and the second magnitude of power as a function of an operating mode of each processor in the motor control system, wherein the operating mode is selected from one of:
    - a stand-alone mode in which wiring of the motor control system electrically connects the corresponding converter and the corresponding inverter for the processor to a first DC bus from the at least one DC bus and the first DC bus is not connected to another of the at least one DC busses,
    - paralleled mode in which the wiring of the motor control system electrically connects the corresponding converter and the corresponding inverter for the processor to a first DC bus from the at least one DC bus and the first DC bus to at least one other DC bus, and
    - a shared DC bus mode in which the wiring of the motor control system electrically connects a first DC bus connected to the inverter corresponding to the processor to at least one other DC bus, and
  - detect that the wiring of the motor control system is configured for one of the stand-alone mode, the paralleled mode, and the shared DC bus mode and the operating mode of the processor is configured for a different mode than the wiring, the different mode selected from one of the stand-alone mode, the paralleled mode, and the shared DC bus mode when the first magnitude of power does not match the relationship to the second magnitude of power.

7. The control system of claim 6, wherein the relationship between the first magnitude of power and the second magnitude of power is defined as:
- the difference between the first magnitude of power and the second magnitude of power is within a range during the stand-alone mode,
- the first magnitude of power is greater than or equal to the second magnitude of power during the paralleled mode, and
- the first magnitude of power is less than the second magnitude of power during the shared DC bus mode.

8. The motor control system of claim 6 further comprising an industrial controller configured to communicate with each processor.

9. The motor control system of claim 8 wherein each processor generates a fault message when a mismatch is detected and communicates the fault message to the industrial controller.

10. The motor control system of claim 9 wherein the industrial controller is configured to disable each of the inverters corresponding to the processor generating the fault message when the fault message is received.

* * * * *